United States Patent
Kanie

(10) Patent No.: US 6,726,417 B2
(45) Date of Patent: Apr. 27, 2004

(54) CLIP

(75) Inventor: Hideki Kanie, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/194,748

(22) Filed: Jul. 12, 2002

(65) Prior Publication Data

US 2003/0143053 A1 Jul. 31, 2003

(30) Foreign Application Priority Data

Jan. 29, 2002 (JP) ........................................ 2002-019495

(51) Int. Cl.$^7$ ................................................ F16B 13/06
(52) U.S. Cl. ............................ 411/48; 411/41; 411/51; 411/60.1
(58) Field of Search ............................ 411/41, 45, 46, 411/48, 60.1, 51

(56) References Cited

U.S. PATENT DOCUMENTS

| | | | | |
|---|---|---|---|---|
| 5,085,545 A | * | 2/1992 | Takahashi | 411/48 X |
| 5,201,623 A | * | 4/1993 | Benedetti et al. | 411/41 X |
| 5,211,519 A | * | 5/1993 | Saito | 411/48 X |
| 5,632,581 A | * | 5/1997 | Hasada | 411/48 |
| 5,641,255 A | * | 6/1997 | Tanaka | 411/48 |

* cited by examiner

*Primary Examiner*—Neill Wilson
(74) *Attorney, Agent, or Firm*—Harness, Dickey & Pierce, P.L.C.

(57) ABSTRACT

The clip 1 comprises a hollow bushing 6 with a flange 10 and a shank 11, and a pin 5 with a shank 9 inserted into the bushing 6. The pin shank 9 is inserted into the bushing shank 11 to enlarge the bushing shank 11 so workpieces 2, 3 are connected to each other by the enlarged section of the bushing shank 26 and the bushing flange 10. A guide 13 extending from the end of the bushing shank so the pin shank is inserted into the bushing shank 11 without enlarging the bushing shank is formed in the end of the pin shank 5. The guide 13 has a large diameter section 14 larger than the end of the bushing shank. The diameter of the large diameter section 14 is formed so as to be larger than the diameter of a thick section 26 of the creep-deformed bushing shank when enlarged by the pin shank.

5 Claims, 5 Drawing Sheets

CLIP

FIELD OF THE INVENTION

The present invention relates to a clip comprising a bushing with a hollow flange and shank, and a pin with a shank for insertion into the bushing, in which the bushing shank is inserted into holes in workpieces such as a plurality of panels, and in which the pin shank is inserted from the bushing flange end into the hollow shank of the bushing, the diameter of the bushing shank is expanded, and the plurality of workpieces are joined together by the expanded-diameter bushing shank section and the bushing flange.

BACKGROUND OF THE INVENTION

Clips well known in the art comprise a bushing with a hollow flange and shank, and a pin with a shank for insertion into the bushing, in which the bushing shank is inserted into holes in workpieces such as a plurality of panels, and in which the pin shank is inserted from the bushing flange end into the hollow shank of the bushing, the diameter of the bushing shank is expanded, and the plurality of workpieces are joined together by the expanded-diameter bushing shank section and the bushing flange.

An example of one of these well known clips is disclosed in Japanese Unexamined Patent Application Disclosure [Kokai] No. 08-004733. This clip has a plastic bushing with a hollow flange and shank, and a plastic pin with a shank for insertion into the bushing. The bushing shank is inserted into holes in workpieces such as a plurality of panels, the pin shank is inserted from the bushing flange end into the hollow shank of the bushing, the diameter of the bushing shank is expanded, and the plurality of workpieces are joined together by the expanded-diameter bushing shank section and the bushing flange.

As mentioned above, these well known plastic clips consisting of a pin and bushing hold workpieces together when the pin shank is inserted into the bushing shank and the diameter of the end of the bushing shank is expanded. When the pin shank is removed after being connected for a long time, the expanded-diameter section of the bushing shank remains deformed with an expanded diameter (although there is some narrowing) due to a form of deformation over the years called "creep deformation". When an attempt is made to reuse the clip, the creep deformation makes it more difficult to insert the large-diameter deformed bushing shank into the holes in the workpieces than inserting a bushing shank without any large-diameter deformation. Even when caution is exercised, the clip may not be inserted properly, the bushing shank may be damaged, or the attachment holes in the workpieces may be damaged.

A clip was disclosed in Kokai No. 08-004733 in which creep deformation is countered by forming a plurality of notches in the bushing shank and by forming a hole in the end of the pin shank for receiving the end of the bushing shank. When the pin shank is removed from the bushing shank after being connected for a long time, the end of the bushing shank is received by the hole in the end of the pin shank, the diameter of the large-diameter section of the bushing shank is removed from the pin shank and narrowed, and the clip is easily removed. This counters the creep deformation in the bushing shank. However, the formation of a hole in the end of the pin shank for receiving the bushing shank means the pin shank has a complicated shape. Also, when there has been a significant amount of creep deformation in the bushing shank, the reception of the end of the bushing shank into the hole in the pin shank is by no means assured. As a result, the effects depend on the circumstances.

Therefore, the purpose of the present invention is to provide a clip that can be re-used even when the clip has a creep-deformed bushing shank despite having a pin shank with a simple shape.

SUMMARY OF THE INVENTION

The purpose of the present invention is achieved by providing a clip comprising a bushing with a hollow flange and shank, and a pin with a shank for insertion into the bushing, wherein the bushing shank is inserted into holes in workpieces such as a plurality of panels, wherein the pin shank is inserted from the bushing flange end into the hollow shank of the bushing, the diameter of the bushing shank is expanded and the plurality of workpieces are joined together by the expanded-diameter bushing shank section and the bushing flange, wherein a guide is formed in the end of the pin shank extending from the end of the bushing shank in a position where the diameter of the bushing shank does not expand with the pin shank inserted into the bushing shank, wherein the guide has a large-diameter section with a diameter larger than the end of the bushing shank, and wherein the diameter of the large-diameter section is greater than the diameter of a creep-deformed bushing shank section when the diameter is expanded by the pin shank.

When the pin shank is removed from the bushing shank after a long period of time to detach workpieces for repairs or replacement, the large-diameter section of the guide on the end of the pin shank is brought into contact with the bushing shank and removed from the workpieces together with the bushing shank. The clip is removed easily from the workpieces, the workpieces are detached, and the clip can be reused.

Because the guide at the end of the pin shank inserted into the bushing shank has a larger diameter than the end of a creep-deformed bushing shank, the guide has the effect of leading it through the holes in the workpieces. As in the case of a bushing shank without large-diameter deformation, it does not catch in the attachment holes and attachment can be performed easily without taking any special precautions. As a result, the insertion is performed properly, the bushing shank is not damaged, and the attachment holes in the workpieces are not damaged.

In this clip, the large-diameter section at the end of the bushing shank is finely tapered or arrow-shaped towards the end. A thick section is formed in the end of the bushing shank extending into the hollow section of the bushing shank so the diameter of the bushing shank can be greatly expanded by the insertion of the pin shank, and a thin section is formed in the end of the pin shank so as to receive the section near the large-diameter section so the diameter of the thick section is not expanded. As a result, the pin and bushing are temporarily connected so the diameter of the bushing shank is not expanded when the small-diameter section receives the thick section. An elastic locking tab extending towards the hollow section of the bushing is formed in the bushing shank near the bushing flange section or bushing flange, and a catching groove is formed in the pin shank for catching the locking tab when the diameter of the bushing shank is not expanded. As a result, the pin and bushing are temporarily connected so the diameter of the bushing shank is not expanded when the locking tab engages the catching groove, and the bushing shank is prevented from riding over the large-diameter section of the pin shank and coming loose. A receiving groove is formed in the pin shank so as to receive the locking tab on the bushing shank without deformation when the pin shank has been inserted into the bushing shank and the diameter of the end of the bushing shank has been expanded.

The bushing shank is also equipped with legs divided into pluralities circumferentially and extending axially. Here, the section of the legs from the base section near the bushing flange to the section near the end is thinner than the section at the end, and a slit longer than the thickness of the workpieces is formed in the thin section of the legs extending axially.

DETAILED DESCRIPTION OF THE PREFERRED EMBODIMENT

Figure 1:
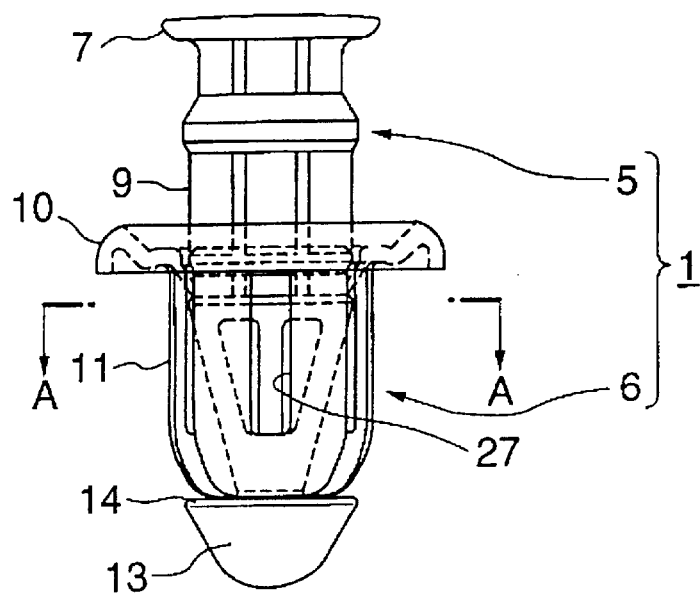
FIG. 1 is a planar view of the non-expanded connecting section of the clip in a working example of the present invention.
Figure 2:
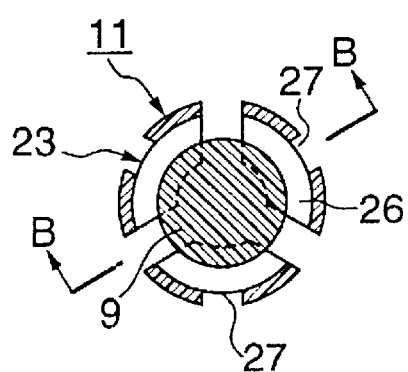
FIG. 2. is a cross-sectional view of the clip in FIG. 1 along line A—A.
Figure 3:
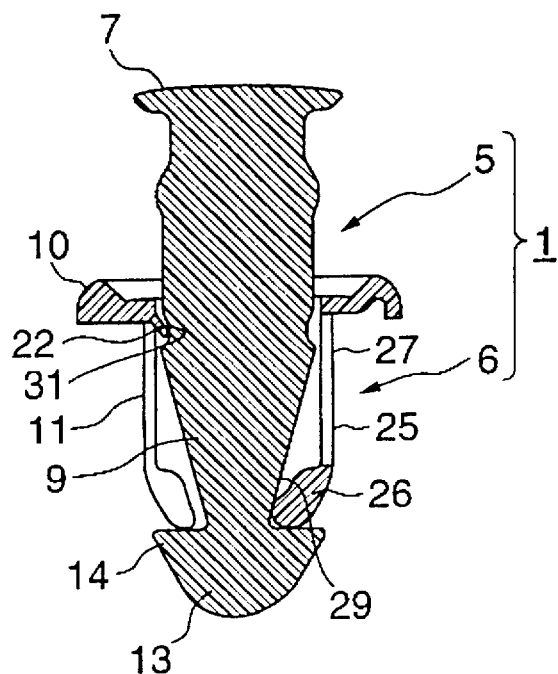
FIG. 3 is a cross-sectional view of the clip in FIG. 2 along line B—B.
Figure 4:
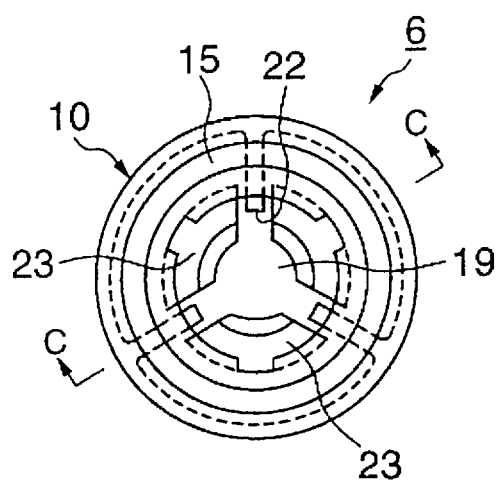
FIG. 4 is a planar view of the bushing.
Figure 5:
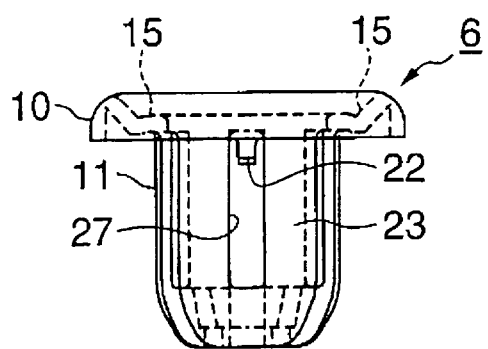
FIG. 5 is a frontal view of the bushing.
Figure 8:
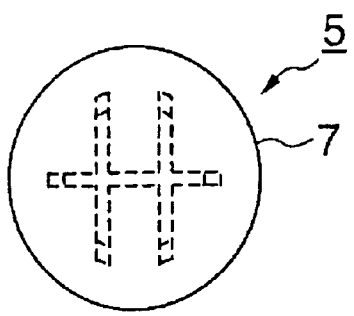
FIG. 8 is a planar view of the pin.
Figure 9:
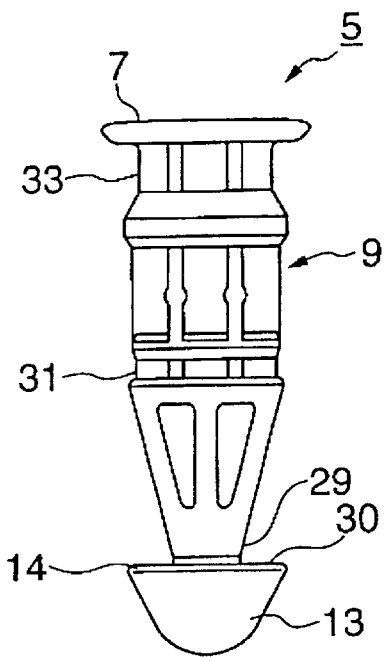
FIG. 9 is a frontal view of the pin.
Figure 10:
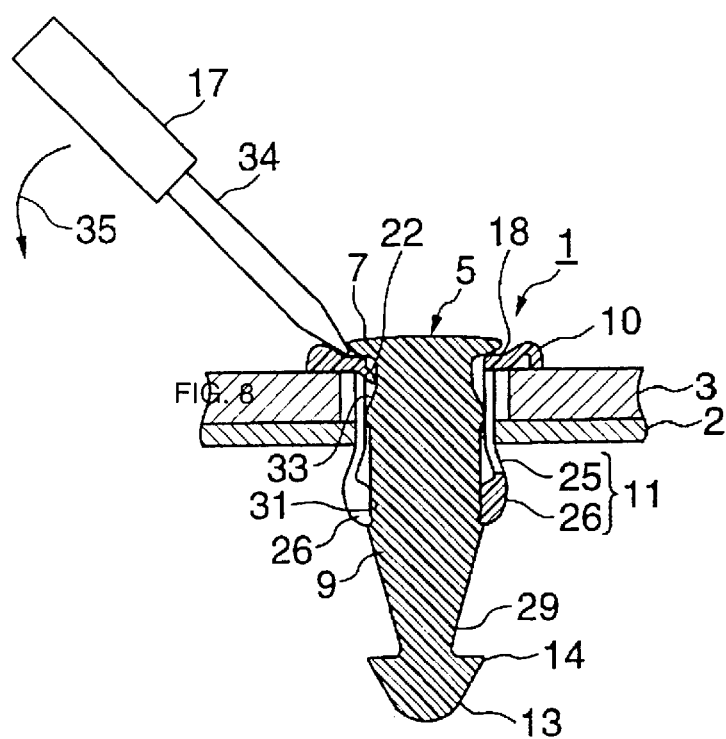
FIG. 10 is a cross-sectional view similar to FIG. 3 showing a clip that is to be removed connected to a workpiece.
Figure 11:
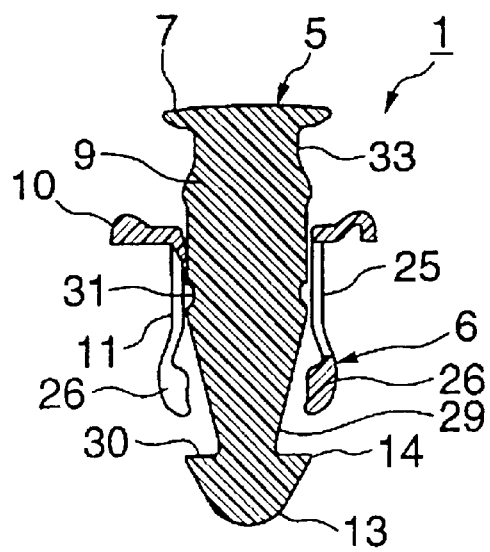
FIG. 11 is a cross-sectional view similar to FIG. 3 showing the clip removed from the workpiece.
Figure 12:
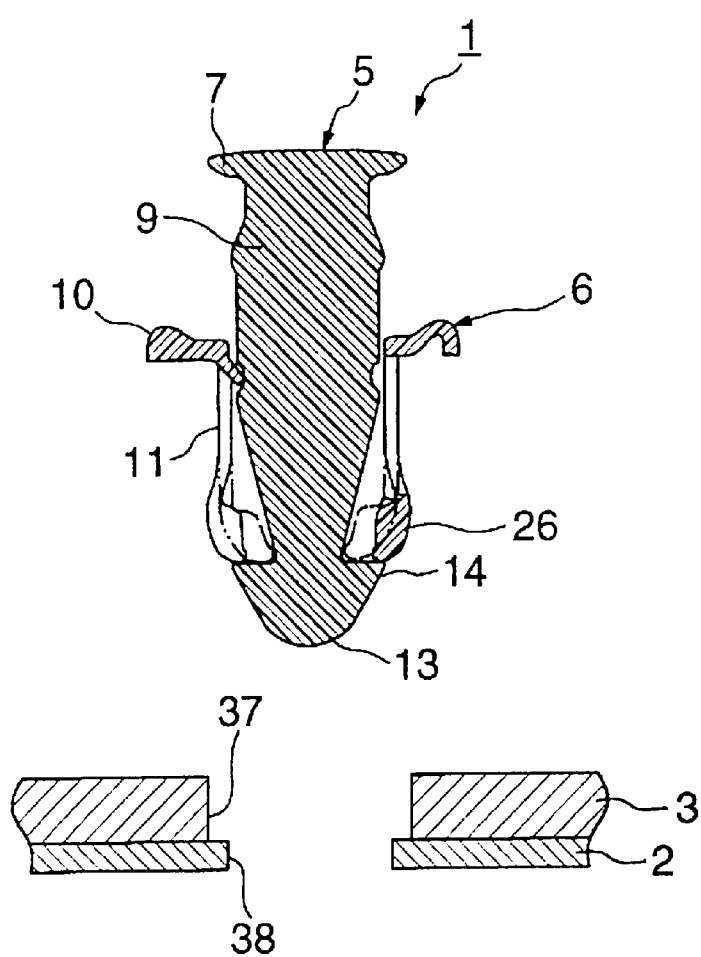
FIG. 12 is a cross-sectional view similar to FIG. 3 showing the reused clip prior to being connected to a workpiece.

The following is an explanation of working examples of the present invention with reference to the drawings. FIG. 1 through FIG. 9 show the clip 1 in the first working example of the present invention. In order to connect two workpieces 2, 3 (FIG. 10) such as panels together, the clip 1 is equipped with a pin 5 and a bushing 6 as shown in FIG. 1 through FIG. 3. FIG. 4 through FIG. 7 shows the configuration of the bushing 6 in greater detail. FIG. 8 and FIG. 9 show the configuration of the pin 5 in greater detail. In FIG. 10, the attached clip 1 is removed from the workpieces 2, 3 in order to repair or replace the workpieces. Here, workpiece 2 is a car body and workpiece 3 is a component attached to the car body. FIG. 11 shows a clip 1 removed after long-term use. FIG. 12 shows the reused clip 1 in FIG. 11 before being inserted into the workpieces 2, 3.

The clip 1 has two components: a pin 5 and a bushing 6. The pin 5 and the bushing 6 are made of plastic and integrated with each other. In the clip 1 shown in this working example, the pin 5 has a round, large-diameter head 7 and a shank 9 beneath the head 7 as shown in FIG. 1 through FIG. 3 and FIG. 8 through FIG. 9. The bushing 6 has a round flange 10 and a shank 11 beneath the flange 10 as shown in FIG. 1 through FIG. 2 and FIG. 4 through FIG. 9. The bushing is hollow so as to receive the pin shank 9. When workpieces 2, 3 such as panels are connected, the bushing shank 11 is inserted into the holes in the workpieces 2, 3, the pin shank 9 is inserted into the hollow section of the bushing shank 11 from the end with the bushing flange 10, the diameter of the end of the bushing shank 11 is expanded, and the end of the bushing shank 11 with the expanded diameter and the bushing flange 10 connect the workpieces 2, 3 to each other. The connection is shown in FIG. 10. As shown in FIG. 1 through FIG. 3, the clip 1 is connected so the pin 5 and bushing 6 do not come apart and are assembled so there is a connection without an expanded diameter. The clip with the pin 5 connected to the bushing 6 is provided to the user, so the time-consuming assembly of the pin and bushing is eliminated. A connection without an expanded diameter occurs when the bushing shank connecting the panels in FIG. 10 is removed. A connection without an expanded diameter also occurs when the clip is reused in FIG. 12.

In the present invention, a guide 13 is formed in the end of the pin shank 9 extending from the end of the bushing shank 11 in a position where the diameter of the bushing shank 11 does not expand with the pin shank inserted into the bushing shank 11. The guide 13 has a large-diameter section 14 with a diameter larger than the end of the bushing shank 11, and the diameter of the large-diameter section 14 is greater than the diameter of the creep-deformed bushing shank 11 section when the diameter is expanded by the pin shank 9. FIG. 8 and FIG. 9 show the configuration of the pin 5 in greater detail.

FIG. 4 through FIG. 7 show the configuration of the bushing 6 in greater detail. The bushing flange 10 is a round plate with a diameter greater than the pin head 7.

A round groove 15 is formed in the top to receive the pin head 7. The diameter of the groove 15 is somewhat larger than the pin head 7. When the pin head 7 is accommo-dated in the groove 15, a gap 18 (FIG. 10) is formed to insert the tip of a tool 17 such as a screw driver between the outer edge of the pin head 7 and the inner edge of the groove 15. A hole 19 is formed in the center of the bushing flange to accommodate the pin shank. The through-hole 19 passes through the bushing shank 11 to accommodate the pin shank 9. Three ribs 21 for reinforcing the flange extend radially at equal angles on the bottom surface of the bushing flange 10. Locking tabs 22 extend elastically from the ribs 21 towards the through-hole 19. The locking tabs 22 can be formed radially from the section of the bushing shank 11 near the bushing flange 10 so as not to adversely affect the expanding diameter of the bushing flange 11. The elastic locking tabs 22 also extend radially inward towards the end of the bushing shank. A catching groove (explained below) formed in the pin shank 9 is engaged to temporarily connect the pin 5 and bushing 6 when the diameter is not expanded. The bushing shank 11 is thus prevented from riding over the large-diameter section 14 of the guide 13 in the pin shank 9 and coming loose.

Figure 6:
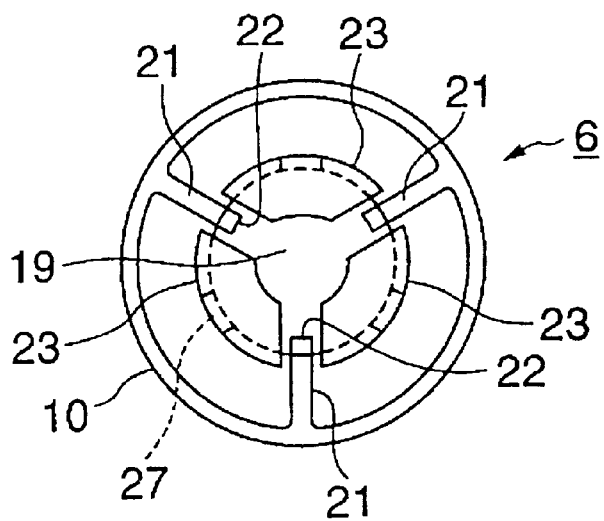
FIG. 6 is a bottom view of the bushing.
Figure 7:
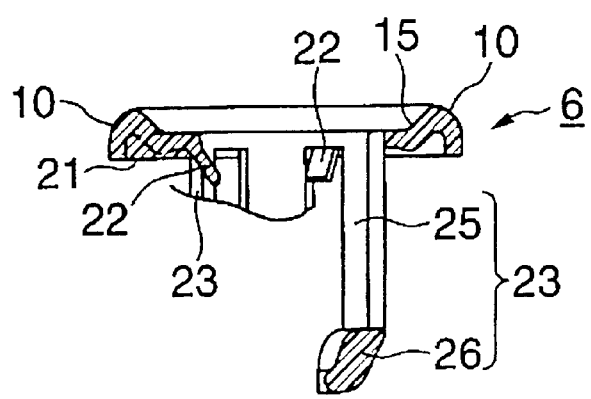
FIG. 7 is a cross-sectional view of a section of the bushing in FIG. 4 along line C—C.

The bushing shank 11 is divided into a plurality of legs 23 (three in this working example) extending circumferentially and axially. By dividing the bushing shank 11 into a plurality of legs 23, the diameter of the bushing shank expands easily when the pin shank 9 is inserted into the bushing shank 11. The ribs 21 and elastic locking tabs 22 are positioned in the gap between the two closer legs 23 as shown in FIG. 6 so as not to adversely affect the expanding diameter of the bushing legs 23. The elastic thin section 25 of the legs 23 from the base section near the bushing flange 10 to the section near the end is thinner than the thick section 26 from the thin section 25 to the end. When the thick section 26 comes into contact with the pin shank 9 engaged in the expanded diameter section (FIG. 10), the elasticity is such that the legs 23 bend sufficiently to the outside. When the pin shank 9 is not inserted as far as the through-hole in the bushing shank 11, the diameter of the bushing shank 11 does not expand. The thin section 25 is flexible enough to be expanded greatly by the thick section 26 when the pin shank 9 is inserted but rigid enough not to become deformed even when expanded greatly.

However, when expanded for one year (i.e., when connected), the plastic construction means some creep deformation is inevitable. The radial thickness of the thick section 26 has to be such that the insertion of the pin shank 9 into the bushing shank 11 expands the diameter of the thick section 26, moves with the bushing flange 10, and connects the workpieces 2, 3. Here, a slit 27 is formed extending axially from the base section of the bushing shank 11 (the section near the bushing flange 10) in the legs 23 to just before the thick section 26. When the pin shank 9 is inserted into the bushing shank 11, the slit 27 allows the legs 23 in the thick section 26 to be expanded outward radially without requiring the application of excessive force.

The following is an explanation of the configuration of the pin 5 with reference to FIG. 1 through FIG. 3, FIG. 8 through FIG. 9 and FIG. 10 through FIG. 12. The pin 5 is longer than the bushing 6 (twice as long in the working example shown in the figures) so the pin remains inserted in through-hole of the bushing 6. A non-expanded connection is shown in FIG. 1 through FIG. 3 and an expanded connection is shown in FIG. 10. FIG. 11 and FIG. 12 show the non-expanded connection when the pin 5 is removed from a bushing 6 with an expanded connection and reused. In FIG. 8 and FIG. 9, the pin head 7 is a round plate, but the edge cuts inward on a slope so as not to be angular from top to bottom. This forms a gap between the top and bottom of the flange into which a tool such as a screw driver can be inserted. The diameter of the pin head 7 should be large enough to keep from coming out of the through-hole 19 in the bushing flange 10.

The pin shank 9 is barrel-shaped and extends downward from the head 7.

As described earlier, a guide 13 is formed in the end (the bottom end in FIG. 9). The end of the guide 13 is finely tapered or arrow-shaped towards the end for easy insertion into the attachment holes in the workpieces. The base of the tapered or arrow-shaped section of the guide 13 has a large-diameter section 14 with a diameter larger than the end of the bushing shank 11. The diameter of the large-diameter section 14 is also larger than the diameter of the thick section 26 in a creep-deformed bushing shank 11 when expanded by the pin shank 9. The diameter of the large-diameter section 14 is smaller than the diameter of the through-hole 19 in the bushing flange 10, but is larger than the diameter of a creep-deformed thick section 26 in a long-term connection (and smaller than the diameter of the thick section 26 in an excessively creep-deformed bushing shank 11). The thick section 26 in a bushing shank 11 creep-deformed by long-term stress is indicated by the solid lines in FIG. 12. The dotted lines indicate an expanded thick section 26 without creep deformation.

The section of the shank near the guide 13 has a small-diameter section 29 for receiving the thick section 26 of the bushing shank 11 without expansion. The reception of the thick section 26 by the small-diameter section 29 forms a temporary connection between the pin 5 and the bushing 6 with a non-expanded section without expanding the bushing shank 11. A locking shoulder 30 is formed in the guide 13 on the small-diameter 29 side which comes into contact with the end of the thick section 26 of the bushing shank 11. This ensures contact with the end of the bushing shank 11. The outer edge of the locking shoulder 30 is rounded in order to keep the clip 1 from coming off the workpieces.

The middle of the pin shank 9 engages the thick section 26 of the bushing shank 11 when the pin shank 9 has been inserted towards the end of the bushing shank 11. The thick section 26 extends outward radially, and a catching groove 31 is formed to keep the bushing shank 11 in an expanded diameter connection. The catching groove 31 catches the elastic locking tabs 22 extending from the ribs 21 in the bushing flange 10 (or bushing shank 11). The engagement of the catching groove 31 with the locking tabs 22 forms a temporary connection between the pin 5 and the bushing 6 in a non-expanded connection where the bushing shank has not expanded. The engagement of the catching groove 31 with the locking tabs 22 also causes the thick section 26 at the end of the bushing shank 11 to expand somewhat in order to prevent the bushing shank from riding over the large-diameter section 14 of the pin shank 9 and coming loose. When the pin 5 is pulled out of the bushing 6 and the clip 1 is removed from the workpieces, this avoids a situation where the pin 5 is removed but the bushing 6 remains in the workpieces. A small-diameter receiving groove 33 is formed in the pin shank 9 for receiving the locking tabs 22 without deformation in an expanded-diameter connection where the pin shank 9 is inserted into the bushing shank 11 near the head 7 and the diameter of the thick section 26 at the end of the bushing shank is expanded. As a result, creep deformation does not occur in the expanded-diameter connection over the long term no matter how much stress is deforming the locking tabs 22.

The following is an explanation of an operation in which a clip 1 with the aforementioned configuration is used to connect workpieces 2, 3, the clip is removed after a connection has been achieved, and the clip 1 is reused to connect workpieces 2, 3. After the pin 5 and bushing 6 are manufactured, the end of the pin 5 with the guide 13 is inserted into the through-hole 19 in the bushing 6 from the bushing flange 10. In this way, the clip 1 is assembled with a non-expanded connection as shown in FIG. 1 through FIG. 3. In a non-expanded connection, the thick section 26 is accommodated by the small-diameter section 29 without an expanded connection, the locking tabs 22 engage the catching groove 31, and a non-expanded connection is maintained. The clip 1 is then shipped to the user with the pin 5 and bushing 6 in a non-expanded connection. When the clip is used or reused, the pin 5 and bushing 6 remain connected and are not separated. When attached, the bushing shank 11 is inserted into the through-holes in the workpieces 2, 3, the bushing flange 10 is brought into contact with workpiece 2, and pressure is applied to the pin head 7 using a finger. When the pressure is applied, the thick section 26 on the legs 23 of the bushing 6 extend out radially and an expanded connection (see FIG. 10) is created. The diameter of the thick section 26 expands, and the expanded section and the bushing flange 10 connect the workpieces 2, 3 to each other. When pressure is applied, the slit 27 in the legs 23 reduces the amount of pressure required (i.e., the set load). Because the thick section 26 of the bushing shank 11 engages the catching groove 31 in the pin shank 9 in the expanded connection in FIG. 10, the expanded connection is retained and the workpieces 2, 3 remain connected. The locking tabs 22 are accommodated by the receiving groove 33 in the pin shank 9, and the deformation stress is countered.

When detaching the workpieces 2, 3 to repair or replace them, the tip 34 of a tool 17 such as a screwdriver is inserted in the ring-shaped gap 18 between the outside edge of the pin head 7 and the groove-like edge of the bushing flange 10 as shown in FIG. 10. When moved in the direction of the arrow 35, the pin head 7 is lifted from the bushing flange 10, the thick section 26 passes over the catching groove 31 as far as the small-diameter section 29, and the thick section 26 is reduced in diameter. This is shown in FIG. 11. When the pin head 7 is raised, the thick section 26 at the end of the bushing shank comes into contact with the locking shoulder 30 formed in the large-diameter section 14 on the small-diameter section 29 side of the guide 13, and the clip returns to the non-expanded connection shown in FIG. 1. As a result, the clip 1 is removed from the workpieces 2, 3 and the workpieces are detached, but the pin 5 and the bushing 6 remain connected. Even though the locking tabs 22 engage the catching groove 31 and the thick section 26 at the end of the bushing shank 11 is expanded, the pin 5 and the bushing 6 remain secured to each other. This is so even when the thick section 26 is not in contact with the locking shoulder 30 in the large-diameter section 14 of the pin shank 9. This avoids a situation where the pin 5 is removed but the bushing 6 remains in the workpieces.

When the clip remains connected for a year, the long-term expansion of the thick section 26 in the bush shank 11 causes an expansion of the thin section 25 and creep deformation. In FIG. 12, the solid lines show the position of the thick section 26 of the bushing shank 11 with creep deformation. The dotted lines in FIG. 12 show the position of the thick section 26 without creep deformation. In the present invention, the large-diameter section 14 of the guide 13 in the pin shank 9 has a diameter larger than a creep-deformed thick section 26. Therefore, as shown in FIG. 12, the large-diameter section 14 of the guide 13 is led into the holes 37, 38 in the workpieces 2, 3, and attachment holes 37, 38 are engaged in the same manner as a non-expanded bushing shank. As a result, the pin shank 9 can be inserted into the bushing shank 11 without any special precautions, and the workpieces 2, 3 can be easily attached. Consequently, the insertion is performed properly, the bushing shank is not damaged, and the attachment holes in the workpieces are not damaged.

When the clip in the present invention is to be removed from workpieces for repair or replacement after long-term use and the pin shank is to be extracted from the bushing shank, the large-diameter section of the guide at the end of the pin shank is brought into contact with the bushing shank, the bushing is removed from the workpieces with the pin, the clip is easily extracted from the workpieces, and the workpieces are detached. Because the guide at the end of the pin shank inserted into the bushing shank has a larger diameter than the end of the creep-deformed bushing shank when the clip is reused, the guide is led into the holes in the workpieces without getting stuck, just like a bushing without expansion deformation, and no special precautions are required during the insertion process. As a result, the insertion is performed properly, the bushing shank is not damaged, and the attachment holes in the workpieces are not damaged.

I claim:

1. A clip comprising a bushing with a hollow flange and shank, and a pin with a shank for insertion into the bushing, wherein the bushing shank is inserted into holes in workpieces such as a plurality of panels, wherein the pin shank is inserted from the bushing flange end into the hollow shank of the bushing, the diameter of the bushing shank is expanded and the plurality of workpieces are joined together by the expanded-diameter bushing shank section and the bushing flange, wherein a guide is formed in the end of the pin shank extending from the end of the bushing shank in a position where the diameter of the bushing shank does not expand with the pin shank inserted into the bushing shank, wherein the guide has a large-diameter section with a diameter larger than the end of the bushing shank, wherein an elastic locking tab extending towards the hollow section of the bushing is formed in the bushing shank near the bushing flange section or bushing flange, wherein a catching groove is formed in the pin shank for catching the locking tab when the diameter of the bushing shank is not expanded, wherein the pin and bushing are temporarily connected so the diameter of the bushing shank is not expanded when the locking tab engages the catching groove, and wherein the bushing shank is prevented from riding over the large-diameter section of the pin shank and coming loose.

2. Clip in accordance with claim 1, wherein a receiving groove is formed in the pin shank so as to receive the locking tab on the bushing shank without deformation when the pin shank has been inserted into the bushing shank and the diameter of the end of the bushing shank has been expanded.

3. Clip in accordance with claim 1, wherein the bushing shank is equipped with legs divided into pluralities circumferentially and extending axially, wherein the section of the legs from the base section near the bushing flange to the section near the end is thinner than the section at the end, and wherein a slit longer than the thickness of the workpieces is formed in the thin section of the legs extending axially.

4. A clip comprising a bushing with a hollow flange and shank, and a pin with a shank for insertion into the bushing, wherein the bushing shank is inserted into holes in workpieces such as a plurality of panels, wherein the pin shank is inserted from the bushing flange end into the hollow shank of the bushing, the diameter of the bushing shank is expanded and the plurality of workpieces are joined together by the expanded-diameter bushing shank section and the bushing flange, wherein a guide is formed in the end of the pin shank extending from the end of the bushing shank in a position where the diameter of the bushing shank does not expand with the pin shank inserted into the bushing shank, wherein the guide has a large-diameter section with a diameter larger than the end of the bushing shank, wherein a thick section is formed in the end of the bushing shank extending into the hollow section of the bushing shank so the diameter of the bushing shank can be greatly expanded by the insertion of the pin shank, wherein a thin section is formed in the end of the pin shank so as to receive the section near the large-diameter section so the diameter of the thick section is not expanded, wherein the pin and bushing are temporarily connected so the diameter of the bushing shank is not expanded when the small-diameter section receives the thick section, wherein an elastic locking tab extending towards the hollow section of the bushing is formed in the bushing shank near the bushing flange section or bushing flange, wherein a catching groove is formed in the pin shank for catching the locking tab when the diameter of the bushing shank is not expanded, wherein the pin and bushing are temporarily connected so the diameter of the bushing shank is not expanded when the locking tab engages the catching groove, and wherein the bushing shank is prevented from riding over the large-diameter section of the pin shank and coming loose.

5. Clip in accordance with claim 4, wherein a receiving groove is formed in the pin shank so as to receive the locking tab on the bushing shank without deformation when the pin shank has been inserted into the bushing shank and the diameter of the end of the bushing shank has been expanded.

* * * * *